No. 857,028. PATENTED JUNE 18, 1907.
E. F. CAMPBELL.
GATE LATCH.
APPLICATION FILED MAR. 22, 1906.
2 SHEETS—SHEET 1.
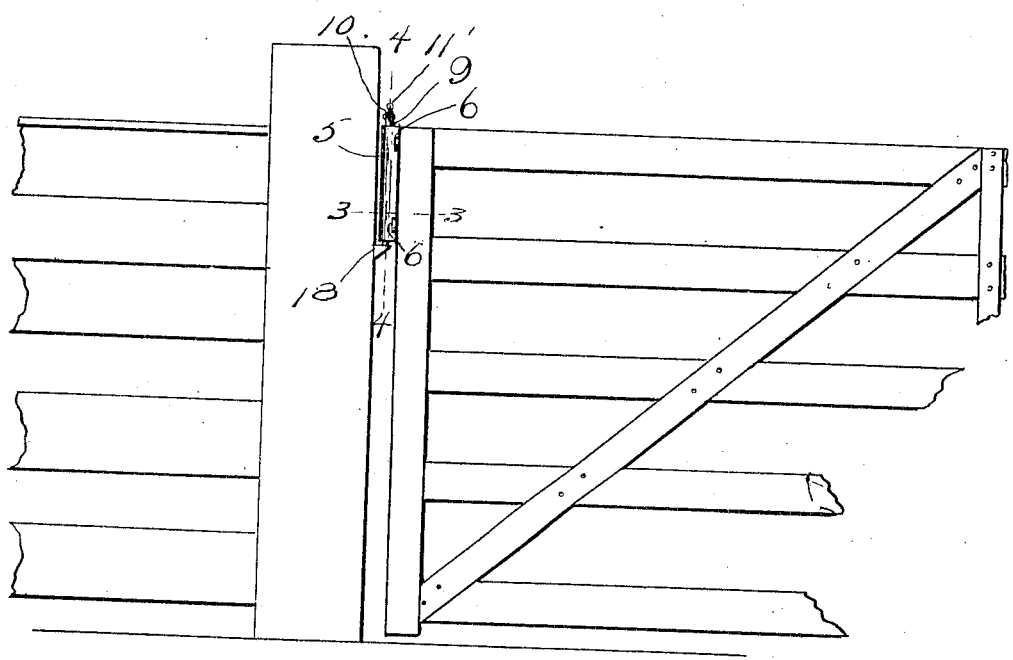
Fig. I.
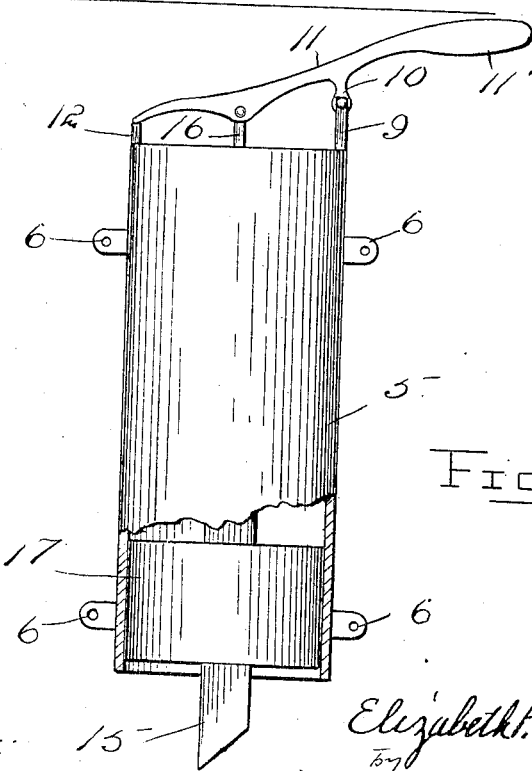
Fig. 2.
Witnesses
Inventor
Elizabeth F. Campbell
by
Chandler & Chandler
Attorneys No. 857,028. PATENTED JUNE 18, 1907.
E. F. CAMPBELL.
GATE LATCH.
APPLICATION FILED MAR. 22, 1906.

2 SHEETS—SHEET 2.

Witnesses
J. C. Simpson
F. C. Jones

Inventor
Elizabeth F. Campbell.
by Chandler & Chandler
Attorneys.

UNITED STATES PATENT OFFICE.

ELIZABETH F. CAMPBELL, OF ANDALUSIA, ALABAMA.

GATE-LATCH.

No. 857,028.　　　Specification of Letters Patent.　　　Patented June 18, 1907.

Application filed March 22, 1906. Serial No. 307,499.

*To all whom it may concern:*

Be it known that I, ELIZABETH F. CAMPBELL, a citizen of the United States, residing at Andalusia, in the county of Covington, State of Alabama, have invented certain new and useful Improvements in Gate-Latches; and I do hereby declare the following to be a full, clear, and exact description of the invention, such as will enable others skilled in the art to which it appertains to make and use the same.

This invention relates to latches and more particularly to latches for gates and has for its object to provide a latch which will be simple and cheap and which may be easily operated.

Other objects and advantages will be apparent from the following description.

Figure 4:
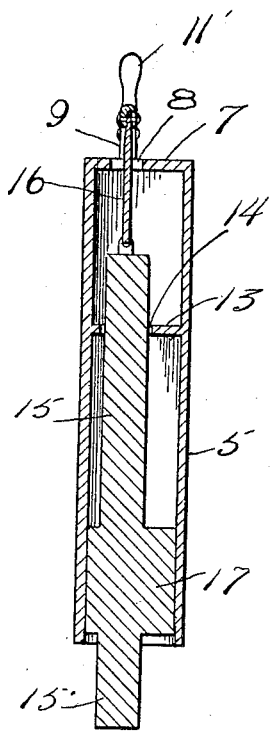
Figure 3:
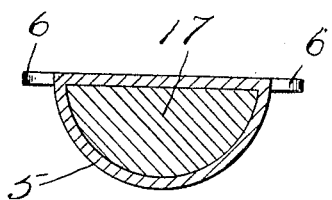

In the drawings forming a portion of this specification and in which like numerals of reference indicate similar parts in the several views. Figure 1 is a view showing a portion of a gate and a post, the present invention being attached thereto. Fig. 2 is a view of a latch, the casing being cut away to show the bolt and weight. Fig. 3 is a cross section on line 3—3 of Fig. 1. Fig. 4 is a vertical section on line 4—4 of Fig. 1.

Referring now to the drawings, the present invention comprises a cast casing 5 having attaching ears 6. The casing is semicircular in cross section, the chamber therewith being also semicircular and being open at its bottom. A web 7 closes the casing at its upper end and has an opening 8 formed therethrough. A bracket 9 extends upwardly from the casing at one side thereof and pivoted in this bracket, there is a downwardly extending ear 10 carried by the lever 11 between the ends thereof. The lever extends across the opening 8 and an upwardly extending stop 12 is formed upon the casing at the opposite side thereof from the bracket 9 and receives an end of the lever thereupon, thus limiting the downward movement of the lever.

A horizontal web 13 is formed within the casing 5 and has a vertical opening 14 formed therethrough, which registers with the opening 8, but which is somewhat larger than the latter. A bolt 15 is disposed within the casing, and the lower end of the bolt 15' normally extends below the casing. The bolt is slidably engaged in the opening 14 and is connected by means of a link 16 with the lever 11 and formed upon the lower portion of the bolt, there is an enlargement 17, which acts as a weight to cause the bolt to fall quickly and the enlargement is cross sectionally semicircular and fits snugly within the casing so that lateral movement of the bolt at the lower portion thereof is prevented.

A latch-receiving plate 18 of any suitable form is provided.

The lever 11 has a hand piece 11' which extends laterally beyond the casing and which may be pressed downwardly to raise the bolt, as will be readily understood.

What is claimed is:

1. A latch comprising a hollow casing, having a closing web at its upper end and provided with an opening and having a second web therewithin between its ends, said second web having an opening formed therethrough beneath the first named opening, said casing being open at its lower end, a bolt slidably engaged in the opening of the second web and having an enlargement at its lower portion of a size to fit snugly within the casing to prevent lateral movement of the bolt, said bolt projecting downwardly beyond the enlargement to extend through the lower open end of the casing, a lever pivoted between its ends at one side of the casing at the top thereof, said lever having a hand piece extending outwardly beyond the casing at one side of the pivot point, and a link pivoted to the lever at the opposite side of the lever from its end piece and pivoted to the upper end of the bolt.

2. A latch comprising a hollow casing, having a closing web at its upper end provided with an opening and having a second web therewithin between its ends, said second web having an opening formed therethrough beneath the first named opening, said casing being open at its lower end, a bolt slidably engaged in the opening of the second web and having an enlargement at its lower portion of a size to fit snugly within the casing to prevent lateral movement of the bolt, said bolt projecting downwardly beyond the enlargement to extend through the lower open end of the casing, a lever pivoted between its ends at one side of the casing at the top thereof, said lever having a hand piece extending outwardly beyond the casing at one side of the pivot point, said lever being connected with said bolt, and an upwardly extending stop piece carried by the casing at its opposite side from the pivot point of the lever, the lever being arranged for engagement of its end with the stop piece to limit the downward movement of the bolt and the lever.

In testimony whereof, I affix my signature, in the presence of two witnesses.

ELIZABETH F. CAMPBELL.

Witnesses:
   J. M. SNEAD,
   MINERD LEE CAMPBELL.